Aug. 1, 1939.    P. R. JONES    2,168,067
FLEXIBLE PIPE OR TUBING
Filed Jan. 2, 1937

Inventor
Percy R. Jones.

Patented Aug. 1, 1939

2,168,067

UNITED STATES PATENT OFFICE 2,168,067

FLEXIBLE PIPE OR TUBING

Percy R. Jones, Lakeville, Mass., assignor of one-third to Bennison Osborne, Clinton, Mass., and one-third to Maurice H. Van Bergh, New York, N. Y.

Application January 2, 1937, Serial No. 118,854

1 Claim. (Cl. 138—60)

This invention relates to a new and improved type or kind of flexible pipe or tubing which can be used to convey water, oil in any form or gasoline, milk, spirits, grain, gas or any other substance in liquid, powdered or vaporized form.

The invention is illustrated in the accompanying drawing, wherein.

Figure 1:
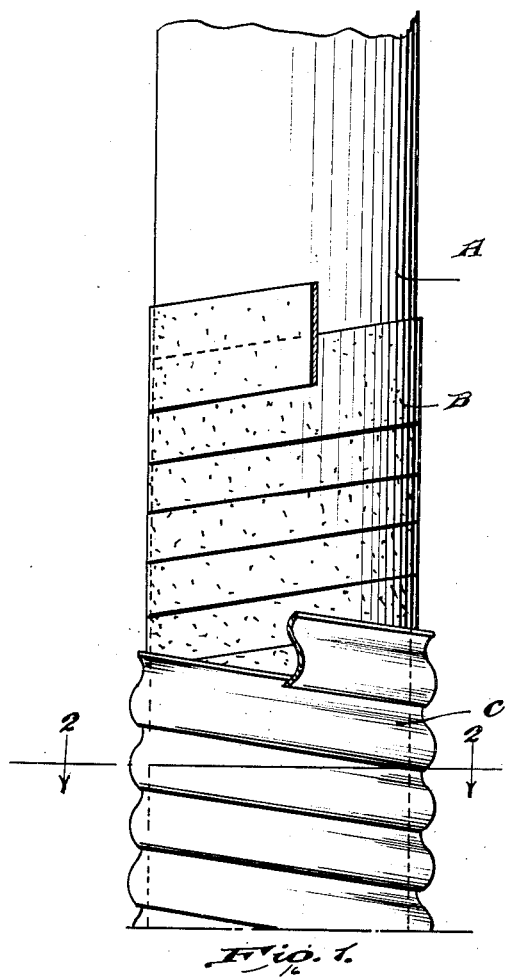
Fig. 1 is a fragmentary sectional view of the heat insulating flexible pipe.
Figure 2:
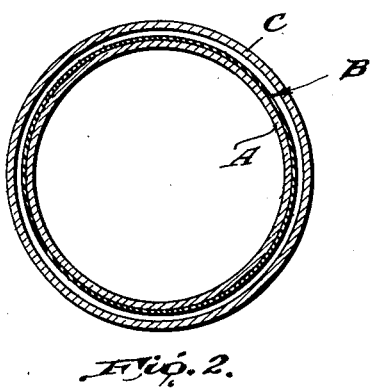
Fig. 2 is a transverse sectional view on line 2—2 of Fig. 1.

This improvement consists of A; an inner unit of tubing, pipe or other subject form composed of some comparatively soft or pliable material or metal like copper, lead or any other composite of metals or alloys or combinations thereof which may be used as an enclosing body of conveyance.

B consists of a substance as a filler, insulator, cushioning body, backing or protector of or to or by and between units A and C and said substance may be made up of paper, asbestos, fiber, cork, or any product made up from or by a combination of any of these products or any other flexible material suitable to be used to advantage to accomplish the same desired results between units A and C.

C consists of a wrapped, woven or braided covering, protector or housing capable of limited sectional movements which forms an encircling or flexible housing body to or of units A and B applied in such a manner as to leave the whole improved or inverted subject flexible to a more or less degree without allowing either units A or B or both to expand to the extent of allowing either units A or B to become a loose or free unit. This housing or covering C may be produced of any suitable metal like steel, copper, brass or any material that may be suitable to fit the requirements to which this flexible pipe or tubing may be applied.

As the inventor does not wish to limit the field of application of this new or improved flexible pipe or tubing he desires not to be restricted to any materials or substances or combinations thereof from which this flexible pipe or tubing can be made or manufactured due to the fact that in its application it may be of benefit in conveyance of acids, penetrative chemical vapors or called upon to operate in extremely high or low temperatures and it is his opinion that there is a need for this invention in almost every field of human endeavor. Therefore he asks the right to use in the manufacture and production of the units A, B and C that comprise this new and useful invention, such materials and substances as are required to apply this invention to any needed use for the benefit of mankind just so long as the three applications of manufacture and production A, B and C are adhered to when making this invention into a useful product when offered for sale.

The inventor claims many advantages are embodied in this new and improved flexible pipe or tubing over and above other pipes or tubing now on the market. The inventor herewith sets forth some of these advantages and uses to which this invention can be put in the following paragraphs:

When a copper pipe or tubing is used as unit A in the construction and manufacture of this invention for the purpose of conveying water or other fluids that cause the accumulation of rust or corrosive deposits such as are common in household pipes manufactured of iron or steel, in comparison this invention having unit A in its construction made of copper, reduces this rust and corrosion deposit to a minimum, therefore making its use more desirable and prolongs the useful life of the installed household plumbing many times. Where for household plumbing application of this invention, if unit B is made of several layers of asbestos paper spirally wrapped tightly in opposite directions around the above described unit A before adding unit C in the manufacture and construction of this invention, a very decided and recognized advantage of nearly complete insulation to maintain a more normal temperature of the fluid thus conveyed is accomplished. An example of this claim is that the recognized fact that several layers of asbestos paper applied to any object of given temperature materially aids in maintaining that temperature, thus hot water transmitted through a pipe or tubing of this inventive manufacture would deliver hotter water at its outlet in comparison with that at its source than a plain water pipe without insulation such as is in common use today in this field as would a pipe or tubing of like manufacture deliver and transmit colder water if unit B, the filler or insulator, was composed of layers of cork paper in the place of asbestos paper.

It is also claimed by the inventor that in a like manner and action the aforehand described invention would materially retard the advance of heat and cold from without which is a detriment to the household plumbing of today. Unit C in the construction and manufacture of this invention in its part or place of completion of this invention, plays several parts as in the case of household plumbing in its application in the conveyance or transmission of water or other liquids or gases. Unit C first forms a protective or armored (more or less) flexible housing or casing around units A and B which may or may not be of more or less destructible nature. Second, it limits the range of flexibility of the units A and B which separately or integrally with one another may or may not be damaged if the range of flexing action were not restricted to some extent. Third, unit C forms a backing to unit B, the filler, which in turn forms a restricting backing to unit A so that when the invention as a whole is bent or flexed it limits the amount of action of unit A within the confines of a given lineal distance in the same manner from without as is employed today from within when one wishes to bend or flex a copper pipe or tube of any length by first filling the inside of said pipe or tube with dry sand, then placing a cork stopper in each end or opening so that the sand forms a backing from within as units B and C of this invention form a backing from without to control or limit the action of expansion over a given lineal area, thus preventing too great a range of expansion and contraction taking place in any given spot. Thus the fourth part unit C plays is to control and limit the action of expansion and contraction of unit A and spread the action out over large enough area while being flexed or bent to prevent any damage, even if flexed or bent a number of times and as this action is thus controlled from without, it is the inventor's contention that due to the fact that this invented pipe or tubing can be bent or flexed while in use because the inside is unobstructed and because no equipment is needed to bend or flex this pipe or tubing while in the action of bending or flexing in installation and application, its value is enhanced to a marked degree. The inventor also claims it can be rolled up much the same as BX wire cable while in storage or transportation which is decidedly in its favor.

The fact that this flexible pipe or tubing needs no elbows or fittings other than one type of connection now on the market, considerably lowers its cost of installation in comparison with other forms of plumbing now on the market. It is the inventor's contention that it can be installed as permanent plumbing with nearly the same ease and care that a rubber hose can be unrolled and installed over and around frame timbers and bent around at all angles in a like manner. This fact of economical installation coupled with the facts of longer life, cleaner and better service and its insulation qualities as well as being highly resistant to damage due to extreme heat and cold, makes it a desired improvement over and above any other pipe or tube now on the market for this use.

The inventor claims the foregoing to be a fair example of how this invention is a forward step in plumbing and piping homes, office buildings, manufacturing plants, etc. and shows the gainful advantages of this invention in every field where easily installed permanent or temporary, reliable piping is desired and is a desired and much needed step forward in human progress.

While it is the intention and aim of the inventor to produce a flexible pipe or tubing to fit any requirements that come within his scope of knowledge, he does not wish to limit the size, thickness or weight of materials used in its manufacture or in any other manner restrict measurements or set up any other limiting standards of manufacture and production other than those that are controlled by law within the confines of the territory within which it may be manufactured or used relative to public safety and standards of application. It is acknowledged by the inventor and herein cited by him that in many fields of application of this invention it will be advantageous to braid or weave the housing or casing C of metal ribbon or wire or other pliable material in place of the wrapped steel armor housing or casing C as illustrated in drawing or plate of this invention as he herein cites that in case of application of this invention where the use of this invention subjects it to constant bending and flexing, the use of a diagonally woven housing C will be needed in conjunction with a sectionally constructed filler B and a special composite metal pipe or tubing A. Therefore, it can readily be seen that to limit the metals and materials that may be used in the manufacture and construction of this invention places limitations on the value and usefulness of this invention. Therefore, the inventor asks that there be no restriction on materials used or applications of these materials in the manufacture and production of the three units A, B and C of this invention or the application of one to another or the legal uses to which the whole three A, B and C may be put when after manufacture they form one completed unit.

The inventor claims that there is already on the market an adapter or connection suitable to connect or joint this invention to any pipe, tube or other unit of conveyance or storage of liquid, gas or powdered substance for which this invention may be used.

Having thus fully described my invention, what I claim as new and desire to secure by Letters Patent of the United States, is—

As an article of manufacture, a flexible pipe or tube consisting of an inner seamless metal tube; one or more intermediate layers of material which may or may not have insulating value and an outer layer formed of metal strip, said metal strip wound thereabout with the abutting edges in interlocked relationship, the whole construction and arrangement being such that the intermediate layer will prevent the outer layer of metal from injuring the inside seamless tube and the outer layer of metal strip having sufficient tensile strength when formed into a surrounding conduit to prevent any collapse of the inside seamless tube while being bent or otherwise handled.

PERCY R. JONES.